US008306788B2

(12) United States Patent
Chen et al.

(10) Patent No.: US 8,306,788 B2
(45) Date of Patent: Nov. 6, 2012

(54) COMPUTER-IMPLEMENTED SYSTEMS AND METHODS FOR EXECUTING STOCHASTIC DISCRETE EVENT SIMULATIONS FOR DESIGN OF EXPERIMENTS

(75) Inventors: Hong Chen, Cary, NC (US); Emily Lada, Raleigh, NC (US); Phillip C. Meanor, Cary, NC (US)

(73) Assignee: SAS Institute Inc., Cary, NC (US)

( * ) Notice: Subject to any disclaimer, the term of this patent is extended or adjusted under 35 U.S.C. 154(b) by 496 days.

(21) Appl. No.: 12/480,366

(22) Filed: Jun. 8, 2009

(65) Prior Publication Data

US 2009/0312992 A1 Dec. 17, 2009

Related U.S. Application Data

(60) Provisional application No. 61/060,633, filed on Jun. 11, 2008.

(51) Int. Cl.
G06F 17/50 (2006.01)

(52) U.S. Cl. ..................... 703/1; 703/2; 703/6

(58) Field of Classification Search .................. 703/1, 2, 703/6
See application file for complete search history.

(56) References Cited

U.S. PATENT DOCUMENTS

| 5,179,596 | A * | 1/1993 | Weingard | 382/158 |
| 6,086,617 | A * | 7/2000 | Waldon et al. | 703/2 |
| 7,548,879 | B2 | 6/2009 | Cash et al. | |
| 7,599,822 | B2 * | 10/2009 | Hearn et al. | 703/2 |
| 7,650,267 | B1 | 1/2010 | Sturrock et al. | |
| 7,788,070 | B2 * | 8/2010 | Grichnik et al. | 703/1 |
| 8,037,108 | B1 * | 10/2011 | Chang | 707/803 |
| 8,208,470 | B2 * | 6/2012 | Gulati et al. | 370/392 |
| 2004/0037313 | A1 * | 2/2004 | Gulati et al. | 370/465 |
| 2004/0148144 | A1 * | 7/2004 | Martin | 703/2 |
| 2004/0193393 | A1 * | 9/2004 | Keane | 703/16 |
| 2004/0199372 | A1 | 10/2004 | Penn | |
| 2005/0222834 | A1 | 10/2005 | Riley | |
| 2006/0031048 | A1 * | 2/2006 | Gilpin et al. | 703/6 |
| 2006/0095583 | A1 * | 5/2006 | Owhadi et al. | 709/238 |
| 2006/0129970 | A1 | 6/2006 | Haas et al. | |
| 2006/0217870 | A1 * | 9/2006 | Hoff et al. | 701/100 |
| 2007/0061321 | A1 * | 3/2007 | Venkataraman et al. | 707/5 |
| 2007/0124237 | A1 * | 5/2007 | Sundararajan et al. | 705/38 |
| 2007/0179769 | A1 * | 8/2007 | Grichnik et al. | 703/11 |
| 2008/0235166 | A1 * | 9/2008 | Sayyar-Rodsari et al. | 706/12 |
| 2008/0313204 | A1 * | 12/2008 | Schultz et al. | 707/101 |
| 2009/0006133 | A1 * | 1/2009 | Weinert et al. | 705/3 |
| 2009/0024367 | A1 * | 1/2009 | Grichnik et al. | 703/2 |
| 2009/0037153 | A1 * | 2/2009 | Grichnik et al. | 703/2 |
| 2010/0020816 | A1 * | 1/2010 | Gulati et al. | 370/412 |

OTHER PUBLICATIONS

A. Prodan, R. Prodan, "Stochastic simulation and modeling", pp. 461-466, 2001.*

(Continued)

Primary Examiner — David Silver
Assistant Examiner — Kibrom Gebresilassie
(74) Attorney, Agent, or Firm — Jones Day

(57) ABSTRACT

Computer-implemented systems and methods for executing stochastic discrete event simulations for a stochastic model through a design of experiments approach. In the design of experiments approach, virtual mappings are generated between model component parameters in a model and the factors/responses contained in the design of experiments. The virtual mappings are used during execution of the model to generate values for the response contained in the design of experiments.

17 Claims, 20 Drawing Sheets

OTHER PUBLICATIONS

S. M. A. Burney, "Simulation of Systems", pp. 1-16, Mar. 10, 2008.*
Gray, Michael A., "Discrete Event Simulation", IEEE, Computing in Science & Engineering, vol. 9, Issue 6, pp. 62-66 (Nov./Dec. 2007).
Running Simulations Repeatedly:: Using Statistics (SimEvents®), http://www.mathworks.com/access/helpdesk/help/toolbox/simevents/ug/bp4wv3c.html (3 pp.), May 5, 2008.
Varying Simulation Results by Managing Seeds:: Using Statistics (SimEvents®), http://www.mathworks.com/access/helpdesk/help/toolbox/simevents/ ug/bp5eimfhtml (3 pp.), May 5, 2008.
Banks, Jerry, "Getting Started with AutoMod", AutoSimulations, Inc., Aug. 2000 [512 pp.].
Anylogic User's Manual, XJ Technologies Company Ltd., www.xjteck.com, 1992-2005 [430 pp.].
Arena Basic User Guide, Rockwell Automation Technologies, Inc., Nov. 2007 [90 pp.].
ExtendSim Overview, http://www.extendsim.com/prods_overview.html [12 pp.].

* cited by examiner

| experiment0 | | | | | |
|---|---|---|---|---|---|
| PointName | StartTime | EndTime | NumServers | Replicates | NumberCustomersServiced |
| point 1 | 0 | 1,000 | 1 | ▲ 2 | |
| point 2 | 0 | 1,000 | 2 | ▲ 2 | |

FIG. 5

| experiment0 | | | | | |
|---|---|---|---|---|---|
| PointName | StartTime | EndTime | NumServers | Replicates | NumberCustomersServiced |
| point1 | 0 | 1,000 | 1 | ▶ 2 | 942 |
| | | | | 1 | 966 |
| | | | | 2 | 918 |
| point2 | 0 | 1,000 | 2 | ▶ 2 | 1,017.5 |
| | | | | 1 | 1,037 |
| | | | | 2 | 998 |

FIG. 6

| PointName | StartTime | EndTime | NumQC | NumRep. | NumServ. | Replicates | NumFixed | AvgUtilQC | AvgWaitQC | AvgUtilRep. | AvgWaitRep. | AvgUtilServ. | AvgWaitServ. |
|---|---|---|---|---|---|---|---|---|---|---|---|---|---|
| point1 | 0 | 2,700 | 1 | 1 | 3 | 5 | 558 | 98.117 | 640.598 | 32.901 | 0.114 | 22.777 | 1.682 |
| point2 | 0 | 2,700 | 3 | 2 | 1 | 5 | 1056 | 61.846 | 3.659 | 16.395 | 16.765 | 67.899 | 0 |
| point3 | 0 | 2,700 | 2 | 3 | 1 | 5 | 1002 | 88.317 | 84.874 | 10.93 | 16.765 | 67.899 | 0 |
| point4 | 0 | 2,700 | 2 | 1 | 3 | 5 | 1006 | 88.508 | 97.37 | 32.901 | 0.114 | 22.777 | 1.682 |
|  |  |  |  |  |  | 1 | 110 | 97.535 | 84.371 | 35.83 | 0.023 | 22.105 | 1.390 |
|  |  |  |  |  |  | 2 | 98 | 86.191 | 21.891 | 29.272 | 0.029 | 21.946 | 1.253 |
|  |  |  |  |  |  | 3 | 94 | 82.413 | 47.808 | 31.828 | 0.079 | 19.992 | 1.557 |
|  |  |  |  |  |  | 4 | 93 | 82.178 | 23.499 | 29.027 | 0.116 | 21.037 | 1.68 |
|  |  |  |  |  |  | 5 | 108 | 94.224 | 309.22 | 38.549 | 0.326 | 28.806 | 2.529 |
| point5 | 0 | 2,700 | 2 | 2 | 1 | 5 | 1002 | 88.317 | 84.641 | 32.79 | 16.765 | 67.899 | 0.234 |
| point6 | 0 | 2,700 | 3 | 3 | 2 | 5 | 1058 | 61.918 | 8.7 | 16.395 | 0.837 | 34.135 | 1.382 |
| point7 | 0 | 2,700 | 2 | 1 | 2 | 5 | 1004 | 88.472 | 97.977 | 16.473 | 0.837 | 34.135 | 0.021 |
| point8 | 0 | 2,700 | 2 | 2 | 3 | 5 | 1006 | 88.515 | 98.456 | 16.468 | 0.114 | 22.777 | 0.095 |
| point9 | 0 | 2,700 | 1 | 1 | 1 | 5 | 558 | 98.117 | 621.012 | 32.79 | 16.765 | 67.899 | 0.234 |
| point10 | 0 | 2,700 | 3 | 3 | 3 | 5 | 1058 | 61.941 | 9.329 | 10.978 | 0.114 | 22.777 | 0.001 |
| point11 | 0 | 2,700 | 1 | 1 | 2 | 5 | 558 | 98.117 | 641.409 | 10.982 | 0.037 | 34.135 | 0 |
| point12 | 0 | 2,700 | 1 | 2 | 1 | 5 | 558 | 98.117 | 621.193 | 16.395 | 16.765 | 67.899 | 0 |

FIG. 20

COMPUTER-IMPLEMENTED SYSTEMS AND METHODS FOR EXECUTING STOCHASTIC DISCRETE EVENT SIMULATIONS FOR DESIGN OF EXPERIMENTS

CROSS-REFERENCE TO RELATED APPLICATION

This application claims priority to and the benefit of U.S. Application Ser. No. 61/060,633, now abandoned (entitled "Systems And Methods For Executing Stochastic Discrete Event Simulations" and filed on Jun. 11, 2008), of which the entire disclosure (including any and all figures) is incorporated herein by reference.

TECHNICAL FIELD

This document relates generally to computer-implemented simulation environments and more particularly to computer-implemented stochastic discrete event simulations for design of experiments.

BACKGROUND

Discrete event simulation is used to model, study, plan, and improve systems in which random events play a dominant role. These systems are often driven by complicated mathematical and logical relationships, making it difficult to derive an analytical solution. Simulation involves the process of building a model that mimics the behavior of a real-world system of interest.

Often, by using statistical analysis and related methods, it is possible to uncover logical and mathematical relationships among elements of a system. Moreover, many real-world systems include not only complex mathematical and logical relationships but also significant random components. For such systems an analytical model, even a simple one, might not be possible. A far better approach is to incorporate the random elements of the system in the model. Discrete event simulation is one such modeling technique.

A prime motivation for building and running a discrete event simulation model is the creation of realistic data on the performance of the system being modeled, with an overall goal of using the data to make statistically valid inferences about the performance of the system. Discrete event simulation offers the opportunity to generate such data without the need to create and observe the system in the real world. This is an attractive alternative in many cases. For example, building several possible versions of the real-world system might be impossible, impractical, or cost-prohibitive. In extreme cases (as in major construction), it might be true that no real version of the system exists. Some versions of the system might provide such poor service (as in medical settings) as to create unacceptable legal liabilities. In these and many other cases, discrete event simulation is clearly preferable to other approaches (e.g., direct observation).

SUMMARY

In accordance with the teachings provided herein, systems and methods for operation upon data processing devices are provided for executing stochastic discrete event simulations for a stochastic model through a design of experiments. For example, a system and method can be configured to generate virtual mappings between model component parameters in a model and the factors/responses contained in the design of experiments. The virtual mappings are used during execution of the model to generate model execution results for simulating an artificial system.

As another example, a computer-implemented method and system can be configured for performing computer simulations using a first model that has a plurality of model component parameters. Candidate factors and candidate responses are stored in a computer-readable data store. From the stored candidate factors and candidate responses, first factors and first responses are selected for generating a first experiment. One or more factor anchors are generated between the model component parameters in the first model and the factors stored in the data store in order to create a virtual mapping between one or more of the model component parameters in the first model and one or more of the factors stored in the data store. One or more response anchors are generated between the model component parameters in the first model and the responses stored in the data store in order to create a virtual mapping between one or more of the model component parameters in the first model and one or more of the responses stored in the data store. The first model is selected for a simulation execution, and the first experiment is selected for use in the simulation execution. The first model is executed to generate simulation results. Wherein during the executing: the one or more factor anchors are resolved so that the model component parameters of the first model are initialized with values of the factors with which the model component parameters are identified by the generated factor anchors. The one or more response anchors are resolved so that the simulation results are stored for the model component parameters of the first model with values of the responses with which the model component parameters are identified by the generated response anchors. The values of the responses are stored in a computer-readable storage medium.

BRIEF DESCRIPTION OF THE DRAWINGS

FIG. 5 is a screen shot showing an experimental design for use with the model of FIG. 4.

FIG. 6 is a screen shot showing results associated with running an experiment.

FIG. 20 is a screen shot of an experiment window for a repair shop model.

DETAILED DESCRIPTION

Figure 1:
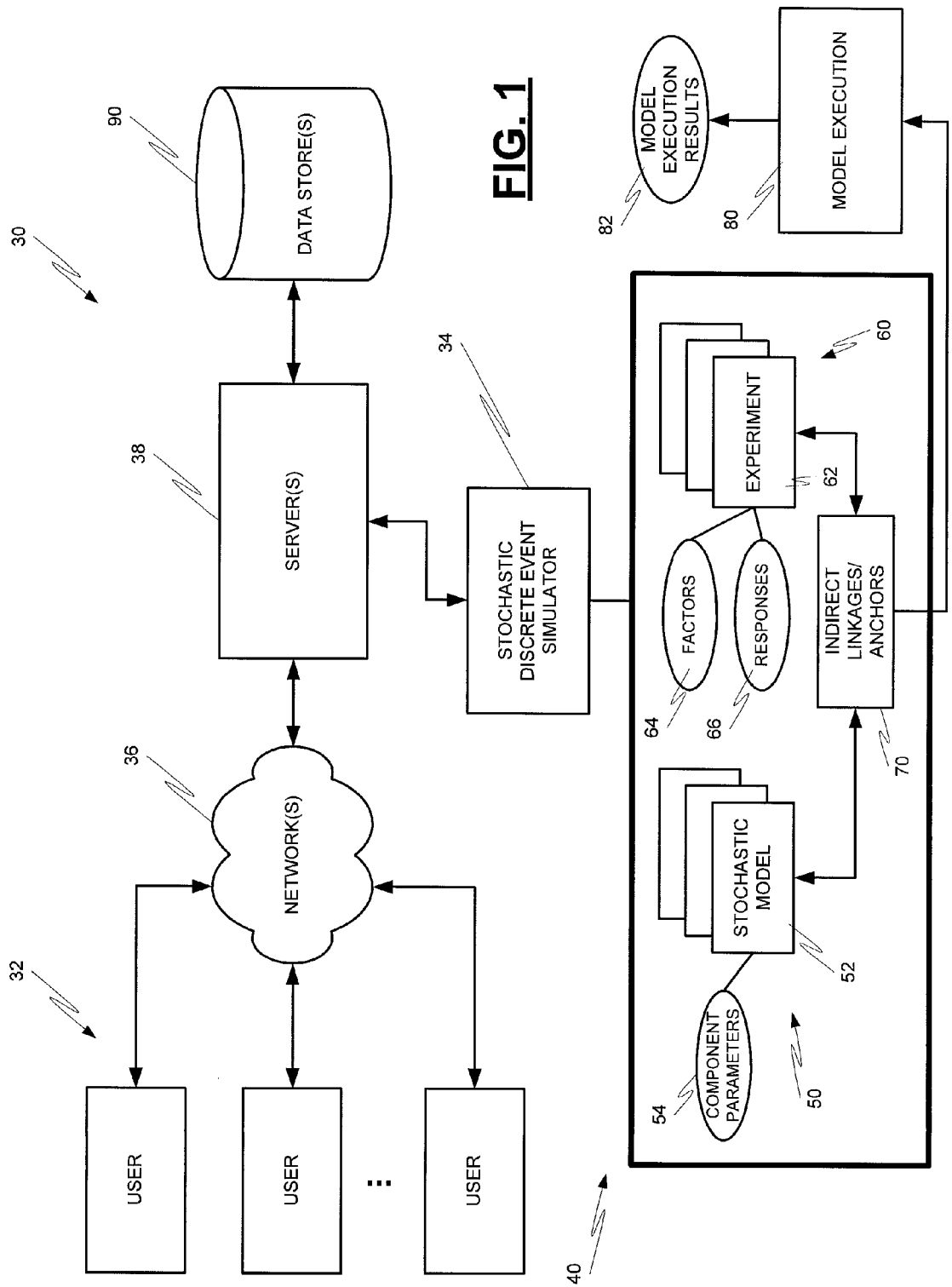
FIG. 1 is a block diagram depicting an environment wherein users can interact with a stochastic discrete event simulator.

FIG. 1 depicts at 30 an environment wherein users 32 can interact with a stochastic discrete event simulator 34 to analyze stochastic models of systems under investigation. Such systems to be analyzed can be of many different types, such as automotive assembly line processes, power consumption processes, financial and banking transactional systems, etc. To model the stochastic (random) aspects of such systems, stochastic components are included in a simulation model.

The simulation environment 30 can provide a computer-implemented facility 40 to construct stochastic model(s) 52 of a system or process of interest. Multiple runs of a simulation model can be executed using different parameter settings for various model components. This set of multiple runs is collectively referred to as an experiment 62.

In previous systems, an experiment 62 is typically designed for a specific model 52. That is, there is a 1-to-1 mapping between an experiment 62 and a simulation model 52. However, simulation problems might require multiple models 50 and multiple experiments 60 for a complete analysis of the system under investigation, potentially resulting in a large amount of duplicated effort.

As shown in FIG. 1, the simulation environment 30 can be configured such that the simulation environment 30 decouples direct (e.g., hard-coded) linkages between models 52 and experiments, thereby allowing for (re)use of multiple experiments 60 with one or more models 50, and vice versa (i.e., M to N model-to-experiment mappings). The simulation environment 30 in this example can accomplish this through indirect linkages 70 (e.g., anchors) that provide an indirect linkage to specific component parameters 54 in a simulation model 52 and the factors 64 and responses 66 that are in the experimental design (i.e., the design of an experiment 62). The anchors 70 are mappings between the model and experiment that are used by process 80 at runtime to generate the results 82 of executing the model.

Figure 2:
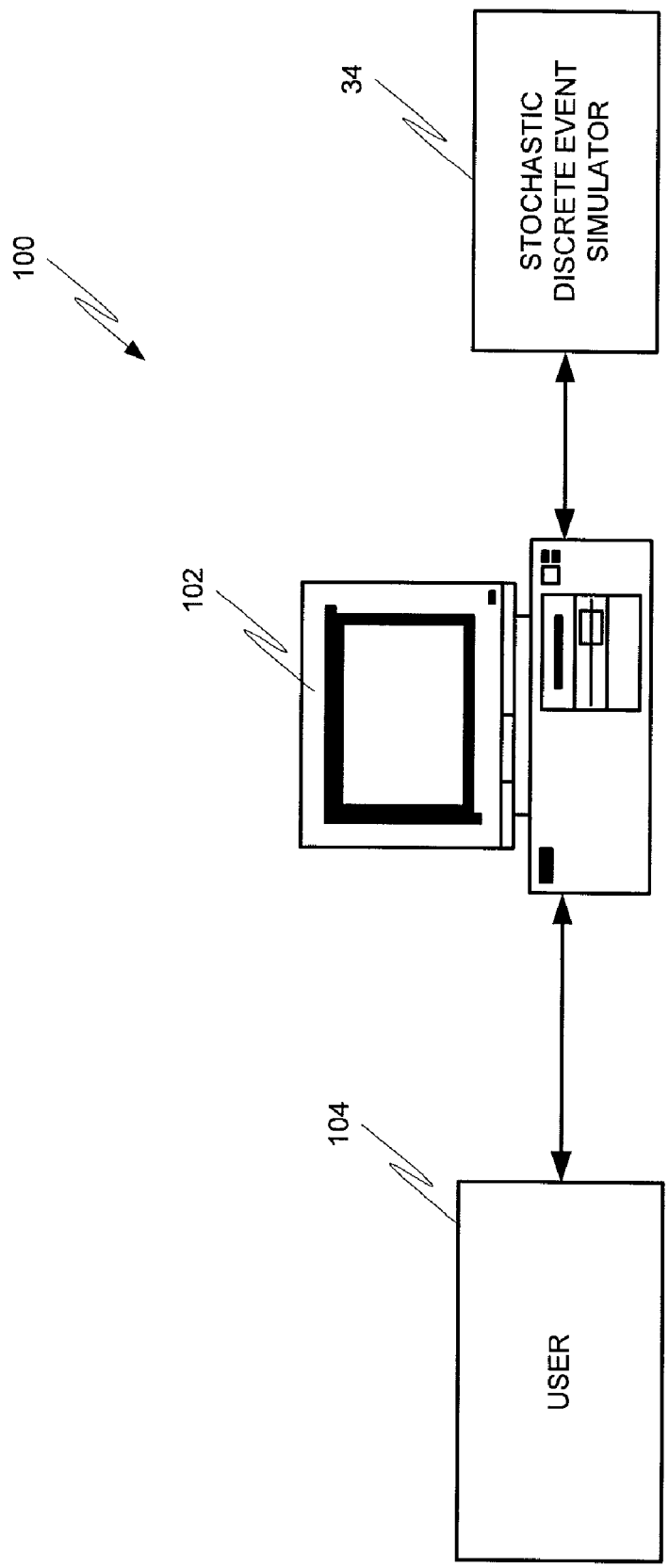
FIG. 2 is a block diagram depicting a single general purpose computer environment wherein a user can interact with a stochastic discrete event simulator.

Users 32 can interact with the simulator 34 through a number of ways, such as over one or more networks 36. Server(s) 38 accessible through the network(s) 36 can host the simulator 34. One or more data stores 90 can store the data to be analyzed by the simulator 34 as well as any intermediate or final data generated by the simulator 34. It should be understood that the simulator 34 could also be provided on other types of computer architectures, such as a stand-alone computer 102 for access by a user 104 as shown in FIG. 2 at 100.

Figure 3:
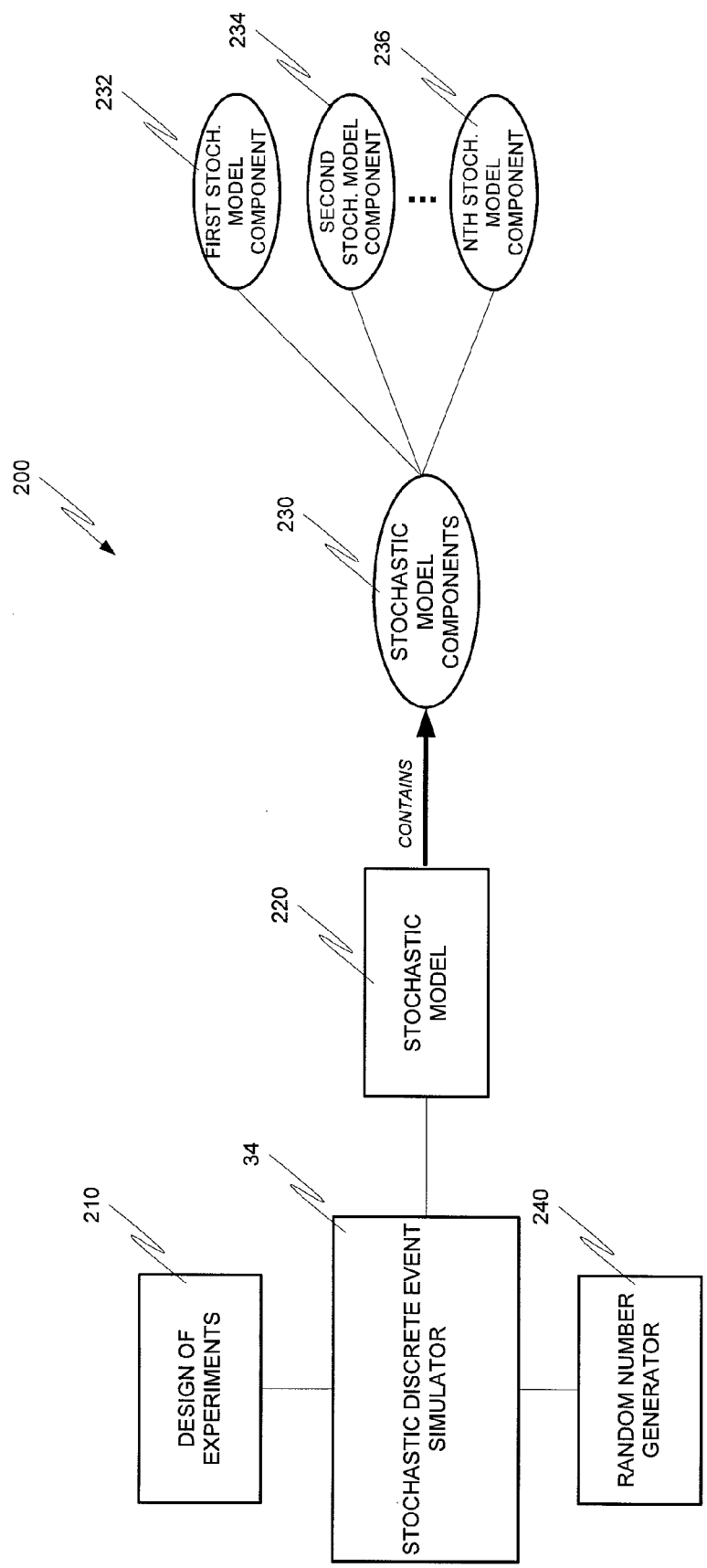
FIG. 3 is a block diagram depicting a model having stochastic model components.

The simulator's stochastic model 52 is usually constructed from a collection of pre-defined components and are connected in a manner reflecting the nature of the system of interest. Some of these components have well-defined, editable parameters while other components might be used to collect and/or display data while the model is executing. For example in a banking transaction process (wherein banking customers are handled by bank tellers or servers), the number of bank tellers can be a parameter whose value can be edited by a user. As another example and as shown in FIG. 3, values can be generated for the stochastic components 230 of a stochastic model 220. This allows the stochastic model components 230 (e.g., first stochastic model component 232, second stochastic model component 234, and additional stochastic model component(s) 236) to represent the sources of random variation within the model 220, such as the arrival of customers at a bank. Within the simulation environment, a random number generator 240 generates random numbers for the stochastic model components 230 in order to simulate such random variations within the system.

After a user is confident that the simulation model 220 accurately reflects the system under investigation, a design of experiments approach 210 is used to provide an effective and efficient method for studying the effects of changes in selected control settings on the performance of the model 220. The structured investigation method provided by an experimental design (or, equivalently, design of experiments) helps to accomplish this. For example, the model 220 can be executed multiple times using different model parameter settings for each run. This set of multiple runs may be collectively referred to as an experiment. A simulation model can be executed multiple times using the same parameter settings and then averaging the results over those runs.

Figure 4:
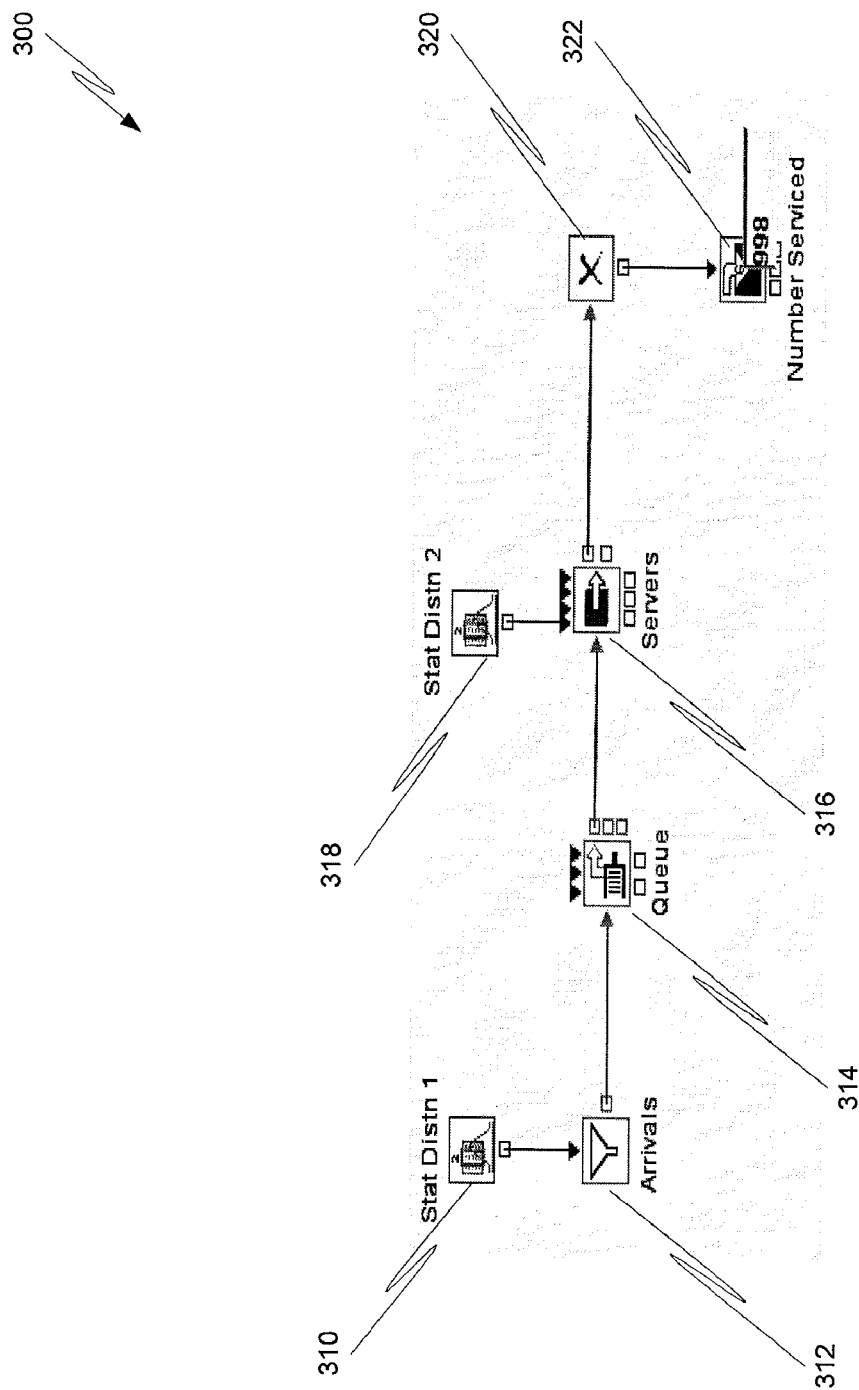
FIG. 4 depicts a queuing simulation model.

As further illustration of the stochastic nature of a stochastic model 220 (as embodied through its stochastic model components 230), FIG. 4 depicts at 300 a queuing simulation model. The model 300 represents customers being served at a bank. Customers arrive at the bank (Arrivals component 312), wait in a single line (Queue component 314) to be served by the next available teller (Servers component 316), and then exit the bank (exit component 320). At some specified rate (component 310), customers arrive and are serviced at some specified rate (component 318) and then leave (component 322 which represents how many customers were serviced). In this model, components 310 and 318 are stochastic model components that are sources of random variation within the model. For example, the stochastic model component 310 labeled Stat Distn 1 contains a probability distribution from which the customer interarrival times are sampled. That is, after a customer arrives at the bank the Arrivals component 312 will ask the Stat Distn 1 component 310 how long it needs to wait until the next customer arrives. Examples of common probability distributions include the exponential distribution, uniform distribution, normal distribution, and beta distribution.

After a simulation model has been developed and validated, it can be used to investigate how the system might perform under different conditions. This is accomplished by setting or initializing various system parameters and/or component parameters in the model, executing the model, and then analyzing any recorded data or measurements. It is not uncommon to evaluate a given model under a wide variety of system and component parameter settings. As an example, for the model 300 in FIG. 4, a user might be interested in studying how the following modifications would affect customer throughput at the bank:

1. Change the operating hours for the bank by modifying the simulation run length.
2. Change the number of tellers (servers), perhaps adding more tellers during the most busy times of the day.
3. Change the arrival rate of the customers.
4. Change the service rate of the customers.

As discussed above, a stochastic model can be used within a design of experiment context by having the model undergo multiple model runs or executions wherein each run uses a different combination of system and/or component parameter settings. In design of experiments terminology, the component or system parameters being initialized in an experiment are called factors, and the values that are being collected or measured are referred to as responses. An individual combination of settings in an experimental design is sometimes referred to as a design point in the experiment. Due to the stochastic nature of simulation models, it is helpful to execute each design point in a simulation experiment multiple times. Each run of the same design point is called a replicate of that design point. In other words, a given set of model parameter settings can be referred to as a design point in an experiment and each model execution using that set of parameters can be referred to as a replicate of that design point. FIG. 5 shows at 400 an experimental design for use with the previously described model.

The experiment in FIG. 5 contains two design points (402 and 404), each with two replications (as shown at 410) and a simulation run length of 1,000 time units (EndTime-StartTime). StartTime, EndTime, and Number of Servers columns are shown respectively at 420, 422, and 424. For all runs of the model, the value of the response named NumberCustomersServiced will be recorded in column 430. In this example, the only model initialization difference between the two design points is that for the design point labeled point 1 the NumServers factor will be set to the value 1, and in the second design point this factor value will be initialized to the value 2.

FIG. 6 shows at 500 the results associated with running this experiment. In display 500, the NumberCustomersServiced value (as shown at 510) is recorded for each replication run and then the replicate response values are averaged for each design point. For example, the first replicate for the first design point has a replicate response value of 966, and the second replicate for the first design point has a replicate response value of 918. The average of these two replicate response values is 942 as shown at 520.

For the second design point (with the number of servers being set at "2"), the first replicate for the second design point has a replicate response value of 1037, and the second replicate for the second design point has a replicate response value of 998. The average of these two replicate response values is 1,017.5 as shown at 530. The overall higher response value of the second design point reflects the effect of adding an additional server to the banking transaction process.

In this example, the bank queuing model includes stochastic model components that are the source of random variation within the model. To generate the random variation for a stochastic model component, many different types of algorithms can be used, such as those that have been developed to use pseudo-random numbers to generate samples from various probability distributions. In these algorithms, a pseudorandom number is a sample from the uniform distribution on the interval [0,1].

Random number generators can create a series of pseudorandom numbers with a period of length greater than 2190. That is, the pattern with which the numbers are generated will not repeat until after 2190 random numbers have been generated. This period is so long that the entire random number series can be logically decomposed into a set of streams, each with a long period. Each stream is further divided into substreams, which are used when running multiple replications of the model.

Another frequently encountered simulation scenario involves constructing multiple models of a system and then evaluating the performance of each of these models using a common set of parameter settings. Assume for this example that the Servers component in the model shown in FIG. 4 has its capacity parameter set to a value of 2. That is to say, the Server component represents 2 bank tellers. Now consider the model depicted at 600 in FIG. 7. In this model there are also two bank tellers 602 and 604 (Server 1 and Server 2), but instead of all the customers waiting in one line for the next available teller as in the first example, there are separate lines (Queues 610 and 612) for each teller. The customer goes to the shortest line and waits for service. In this example the simulation user might want to run each model for the same amount of time and see which model produces the better throughput.

Of course simulation models will typically be much more complicated and detailed than the examples presented thus far. Models can consist of hundreds of components and the user might be interested in performing hundreds of model executions. The process of adjusting and initializing the system or component parameter settings and model execution becomes more labor intensive the more sophisticated the models and simulation scenarios are. While some simulation software packages provide facilities to help automate this process, other simulation environments rely on manually editing various model components to modify the parameter settings and then launching the model execution.

As mentioned above, a set of model runs or executions using a variety of system and component parameter settings can be loosely referred to as an experiment. In the first simulation scenario described above where there is one model being investigated under various conditions, the situation equates to running multiple experiments against the same model. The second scenario has multiple models executed using the same experiment. In design of experiments terminology, the component or system parameters being initialized in an experiment are called factors, and the values that are being collected or measured are referred to as responses.

Most simulation environments do not provide facilities to address the running of experiments and in those that do, there is a 1-1 mapping between a model and experiment. That is to say, a factor in an experiment maps directly to a component parameter in a specific simulation model, and similarly for responses. This is highly inefficient. For example under this paradigm, to run multiple experiments against the same model, it is necessary to make copies of the original simulation model for each experiment. Similarly, to use different models with the same experiment requires making multiple copies of the experiment with each to be linked to a different model. Simulation models and experiments can be very detailed and elaborate and this approach is very time consuming and tedious, and severely limits any reuse of models and experiments.

Figure 8:
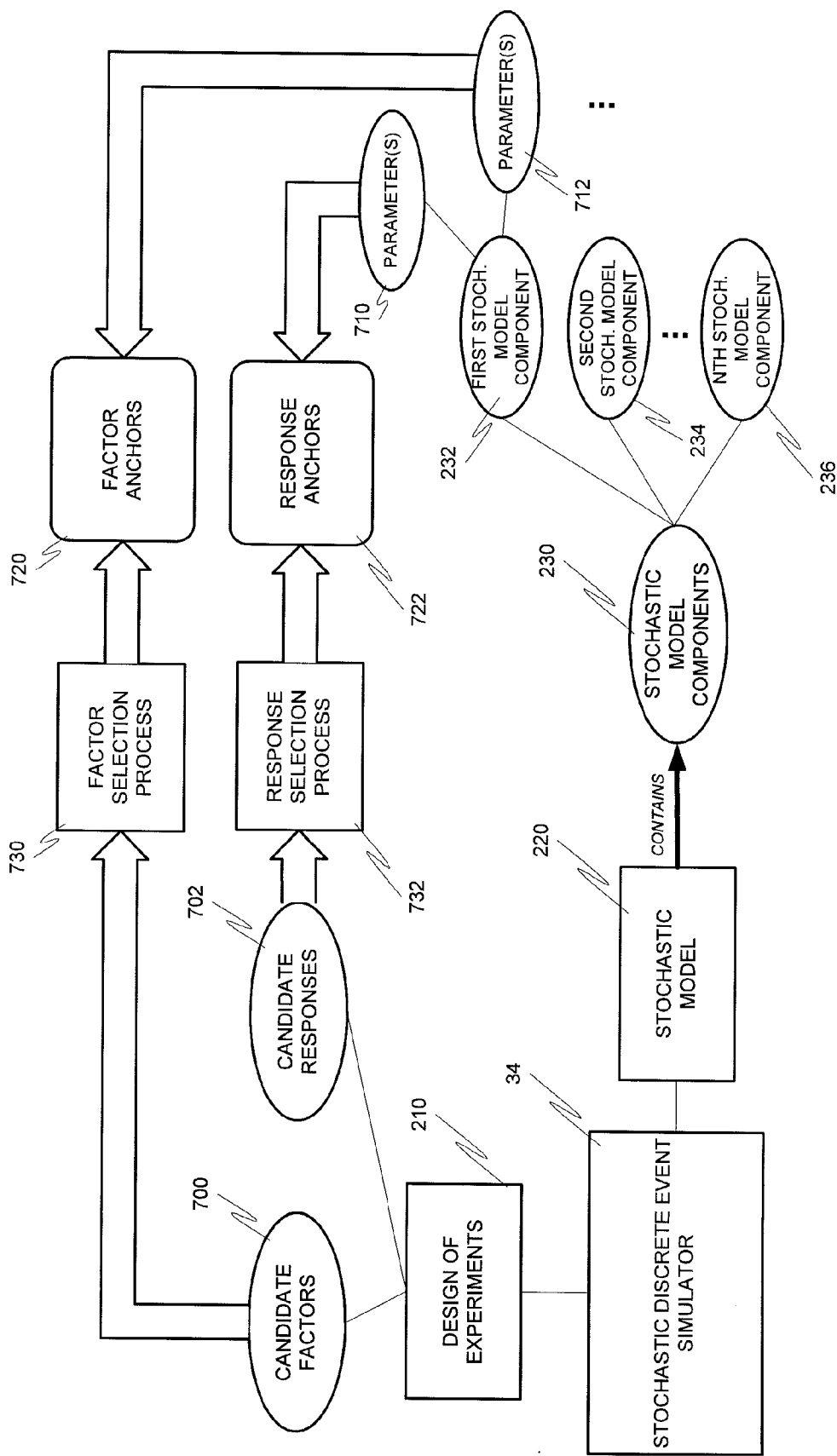
FIG. 8 depicts a simulation environment that provides an indirect linking mechanism.

As shown in FIG. 8, a system can be configured to include a simulation environment that provides an intermediate, indirect mechanism to link the candidate factors 700 and responses 702 included in an experiment with the component parameters 710 and 712 in the simulation model 220, thereby allowing for the decoupling of the model and experiment and possible reuse of both.

The component parameters 710 and 712 in a model 220 that are to be initialized before model execution are mapped to the factors 700 and responses 702 through indirect links (e.g., anchors 720 and 722). That is, the user specifies via processes 730 and 732 what factor or response definition an individual component parameter is associated with a particular model.

Figure 9:
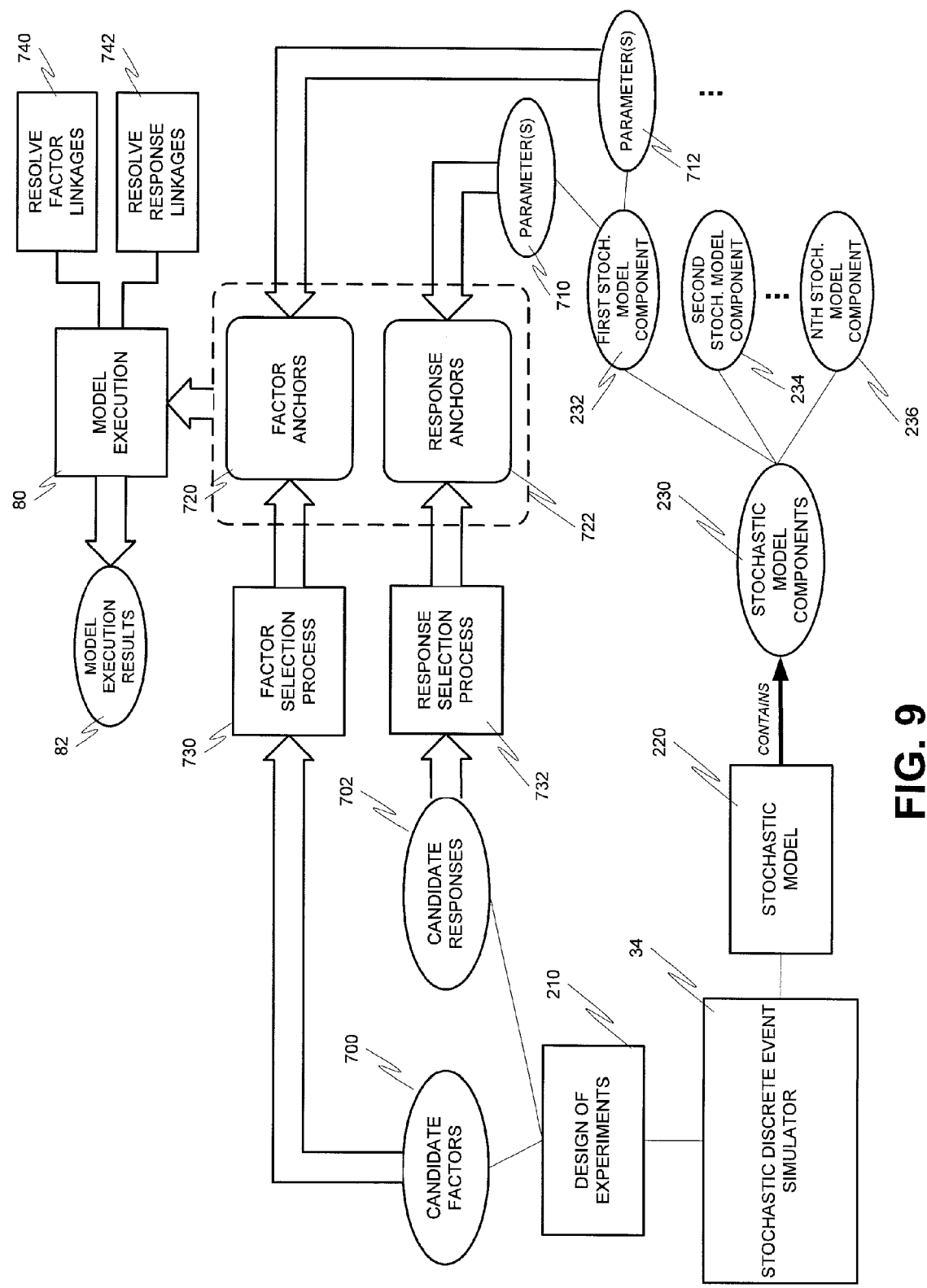
FIG. 9 depicts factor anchors and response anchors being used during model execution to generate model execution results.

FIG. 9 depicts that the factor anchors 720 and the response anchors 722 are used during model execution by process 80 to generate model execution results 82, such as the results shown in FIG. 6 above. As the model simulation proceeds during execution, software instructions resolve at 740 the one or more factor anchors 720 so that the model component parameters 712 of the model 220 are initialized with values of the factors with which the model component parameters 712 are identified by the factor anchors 720. Additionally, software instructions resolve at 742 the one or more response anchors 722 so that the simulation results 82 are stored for the model component parameters 710 of the model 220 with values of the responses with which the model component parameters 710 are identified by the generated response anchors 722.

Figure 10:
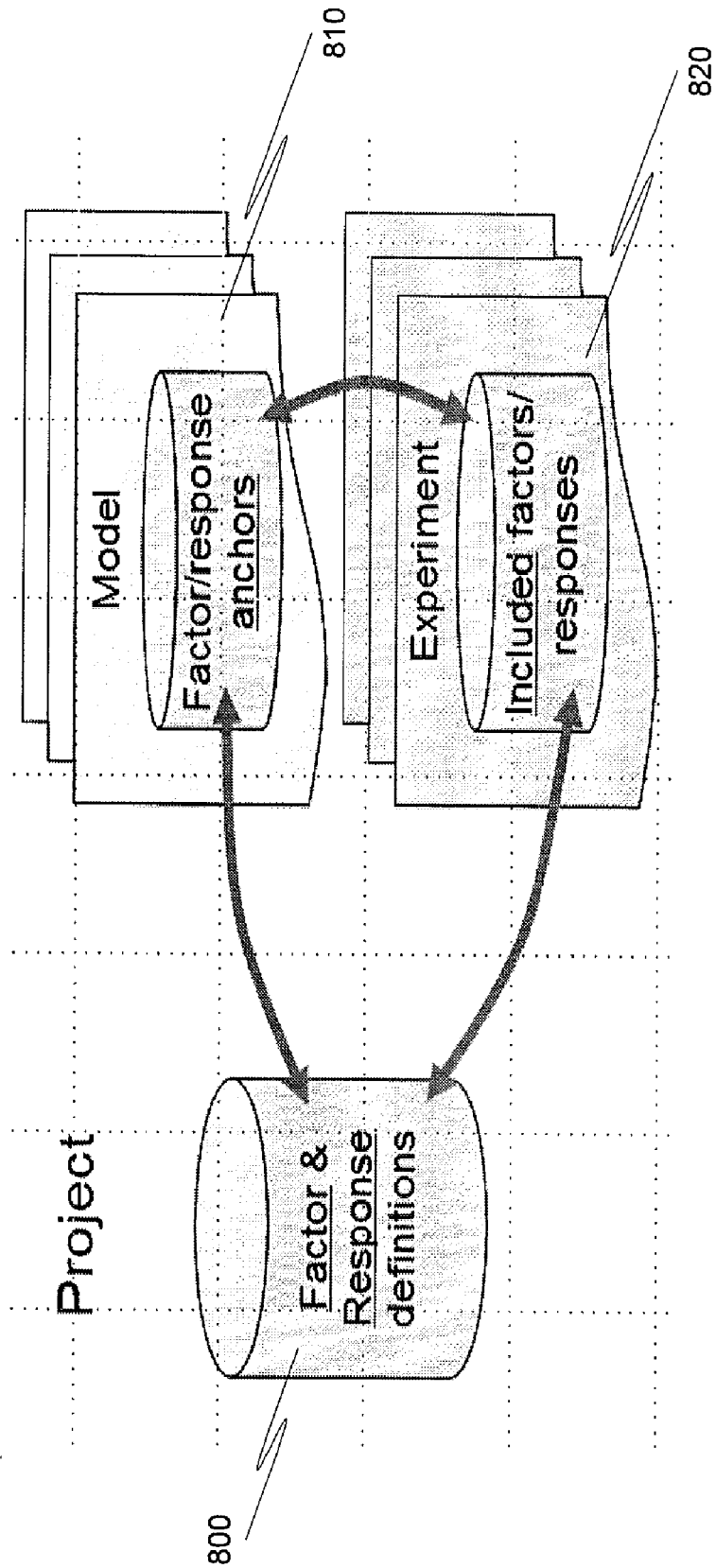
FIG. 10 illustrates factor and response databases containing definitions of potential factors and responses.

It should be understood that the factor anchors 720 and response anchors 722 may be established in different ways. For example, FIG. 10 illustrates that factor and response databases 800 can be created for a specific project that contain the definitions of all potential factors and responses that may be used for any model 810 created within the project. (It should be understood that a single database could also be used to store the definitions of factors and responses.) The user then selects the factors and responses to be included in an experiment 820 from those defined in the databases 800. That is, the user specifies with what factor or response definition in the associated databases 800 an individual component parameter is associated.

As an example, consider the following with reference to the model shown in FIG. 4. Assume that the factor database has a factor named NumberOfServers defined in it and this factor can have integer values of 1 and 2. Assume the response database has a response named NumberOfCustomersServed in it and that the response is of type number. The user of the system can create an anchor that links the capacity parameter of the Servers component in the model to the NumberOfServers factor definition and a response anchor linking the value parameter associated with the NumberServiced model component to the NumberOfCustomersServed response definition. The user could then create an experiment that included the NumberOfCustomersServed factor and the NumberOfCustomersServed response, set the desired value(s) for the NumberOfServers factor in the experiment, and run the model and experiment pair.

When a model and experiment pair is executed, the simulation system will resolve the appropriate linkage between the factors and responses included in the experiment and associated component parameters and measures in the model using the anchor information. Using this process the model has no direct ties to a particular experiment, and vice versa. Once the anchor definitions have been created for a simulation model, the user only needs to specify what model and what experiment they wish to execute and the simulation environment attempts to resolve the appropriate linkage between the two and perform the desired model execution. Accordingly, in addition to providing full design of experiment capabilities in a computer simulation environment, the technique for mapping models to experiments may also provide an efficient and effective means of exploiting reuse of simulation models and experiments.

Figure 11:
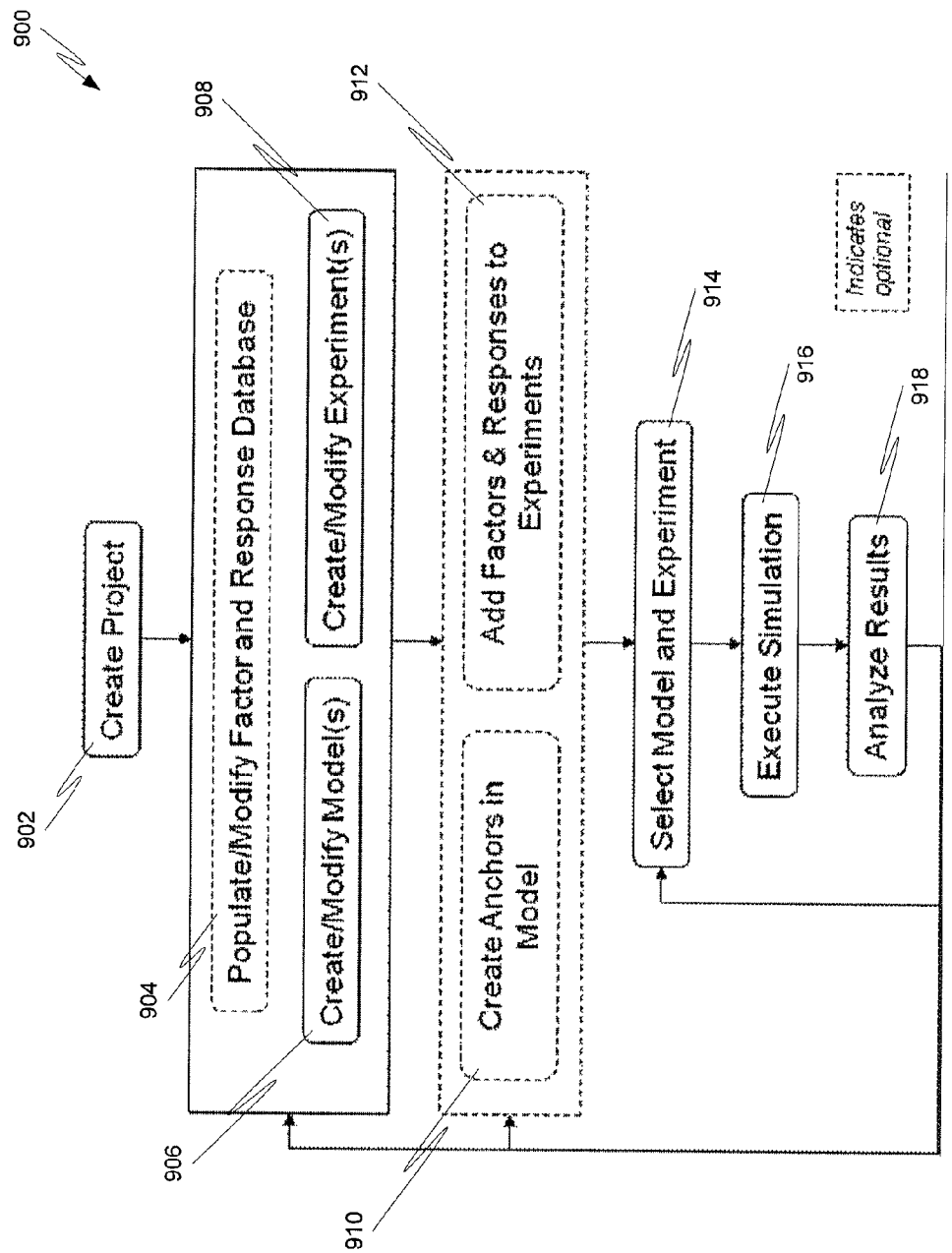
FIG. 11 depicts another example of an operational scenario using the simulation environment.

FIG. 11 depicts at 900 another example of an operational scenario using the simulation environment. In this operational scenario, the user creates at 902 a project, and at 906 and 908 the user creates respectively at least one model and experiment before they can perform any simulation runs. If they wish to initialize any model parameters or record any results, the user also first defines at 904 the factors and responses in the project's factor and response databases. Using the anchor feature in the simulation environment, the user creates at 910 a virtual mapping from factors and responses in the databases to component parameters in a model. For an experiment to initialize or record parameters in a model, the user includes at 912 those factors and responses in the experiment using factor inclusion and response inclusion dialog interface screens available in an experiment window. The user selects the model and experiment at 914 for execution. At runtime when the simulation is executed at 916, the application creates a mapping between the experiment and model (using the anchor and factor/response inclusion information) to determine what parameters need to be initialized and what results to record. A user or another application can then analyze the execution results at 918.

Figure 12:
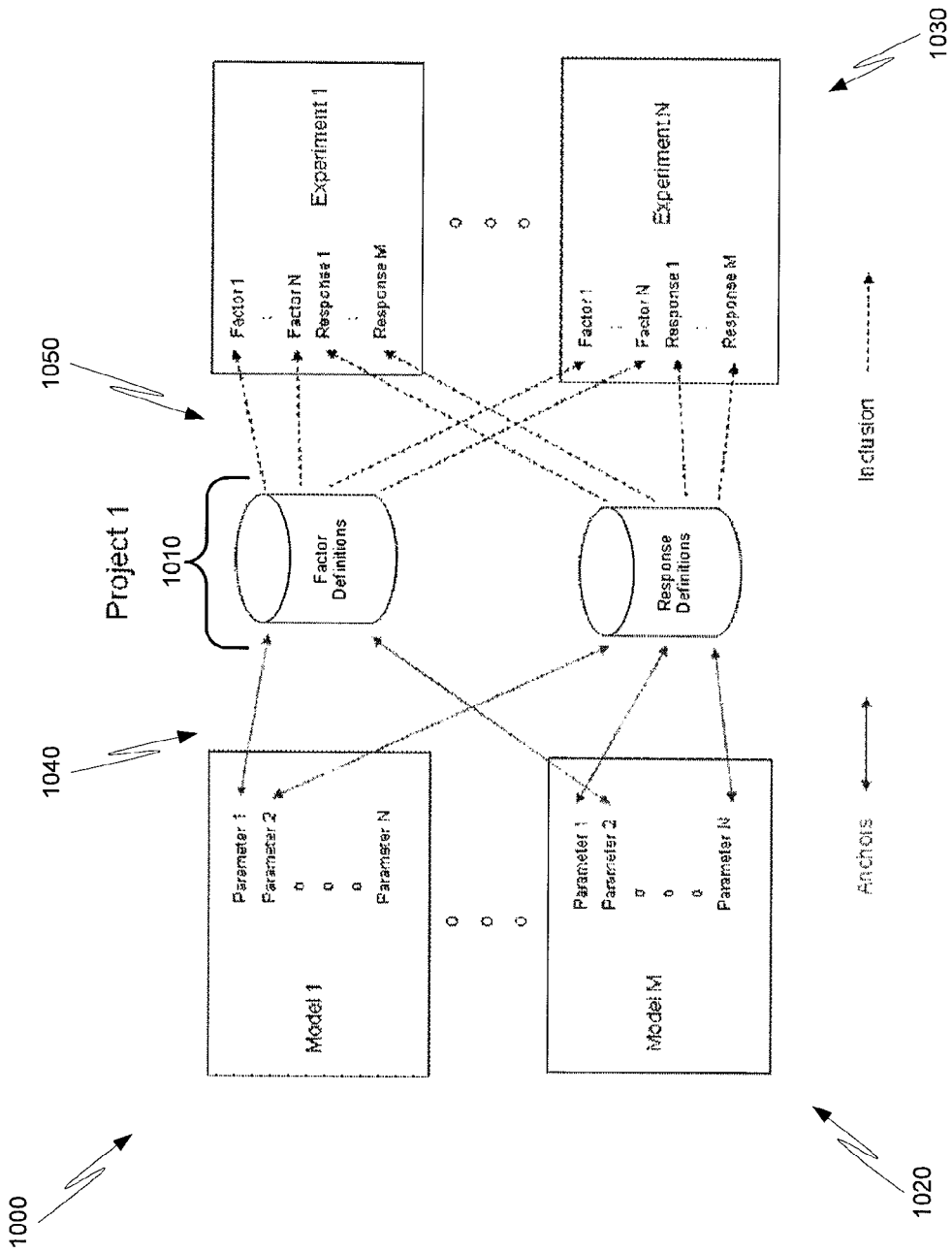
FIG. 12 depicts an example of relationships involving factor and response definitions in a project databases.

FIG. 12 depicts at 1000 an illustration of relationships between factor and response definitions in the project databases 1010 and the models 1020 and experiments 1030 after the user has created anchors 1040 and also includes factors/responses in experiments. The anchors 1040 represent virtual links between the databases 1010 and the models 1020 while the experiment inclusion (as shown at 1050) represents linkage between the experiments 1030 and the databases 1010.

Figure 13:
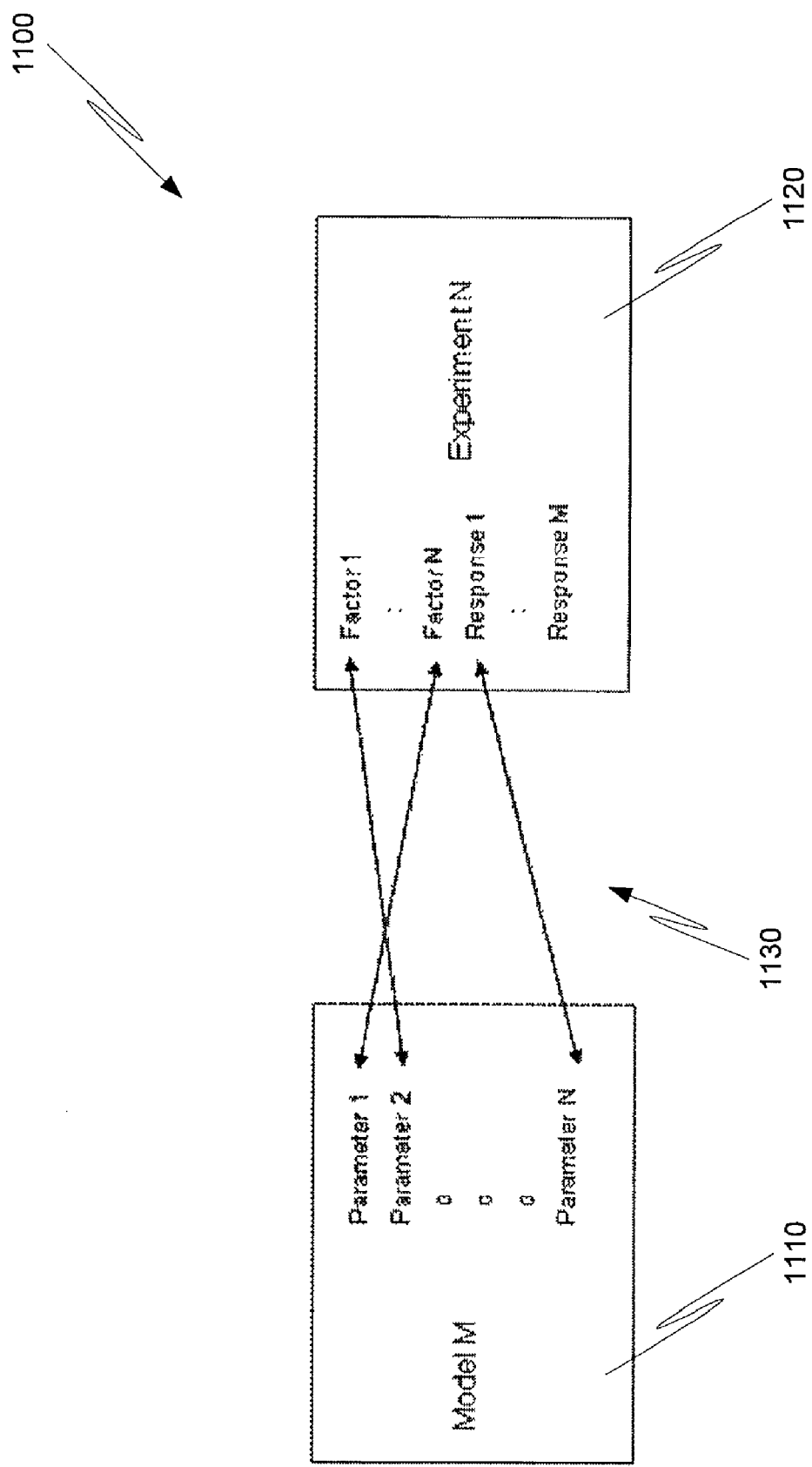
FIG. 13 depicts linkages between an experiment and a model at execution time.

FIG. 13 depicts at 1100 the resulting linkage between an experiment 1120 and a model 1110 at execution time. The application uses the anchor information associated with a model (e.g., model "M" 1110) and the factor and response inclusion information associated with an experiment (e.g., experiment "N" 1120), along with the factor and response databases of a project, to create the appropriate parameter mapping 1130 from the experiment to the model at 1110 runtime.

Figure 14:
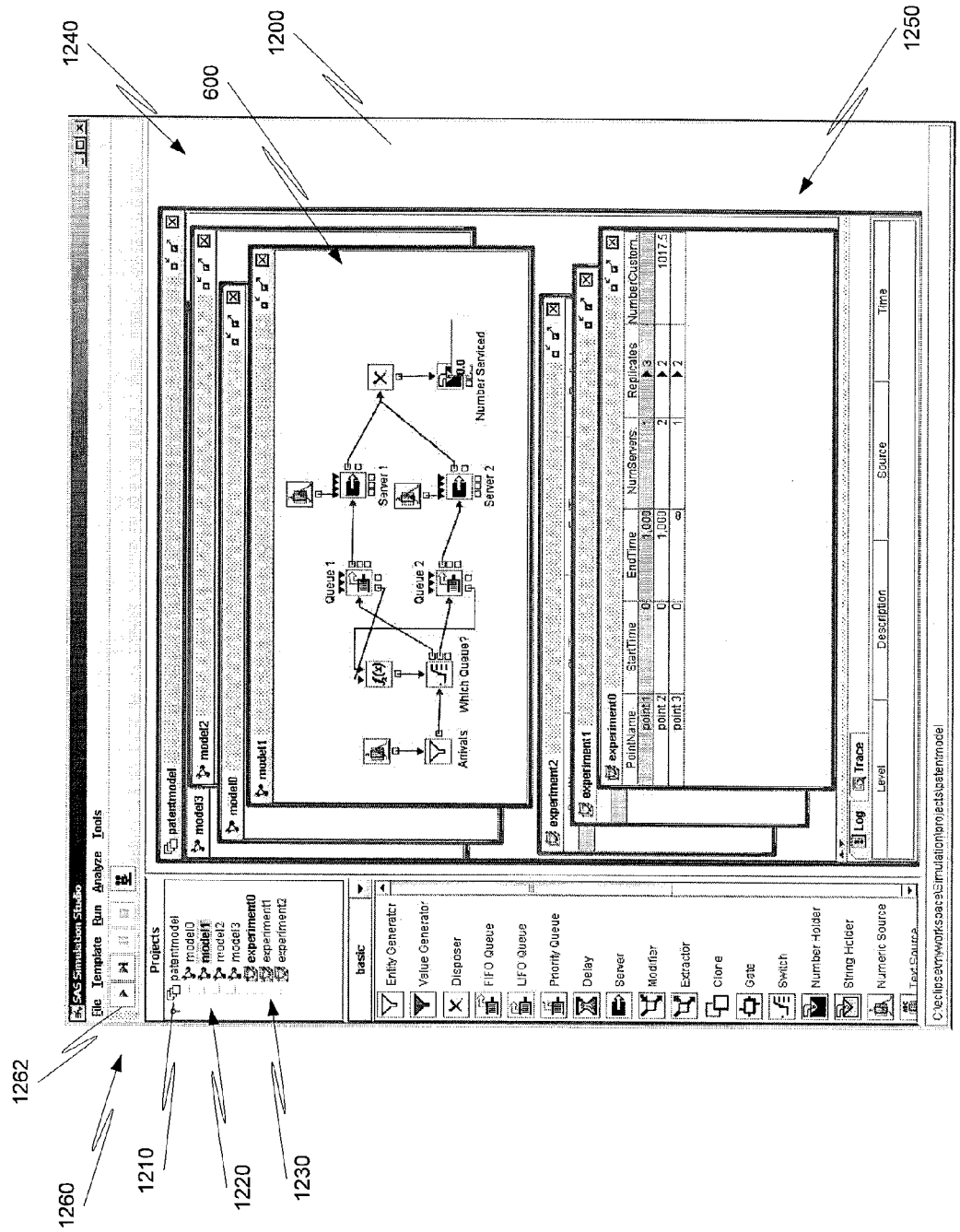
FIGS. 14-18 are screen shots illustrating an operational scenario for creating factors, responses, and anchors.

FIGS. 14-18 are screen shots illustrating an operational scenario for creating anchors. FIG. 14 depicts at 1200 a screen shot which shows how projects can be comprised of one or more models and one or more experiments. This example illustrates that a "patentmodel" project 1210 includes four models 1220 (i.e., model0, model1, model2, and model3) and three experiments 1230 (experiment0, experiment1, and experiment2). The screen shot 1200 shows at 1240 windows of the models, with the focus on the window of model1 600 (i.e., the model discussed above with respect to FIG. 7). The screen shot 1200 shows at 1250 windows of the experiments, with the focus on the experiments window which shows three design points. The various combinations of models and experiments can be executed and controlled, such as through the controls depicted at 1260 (e.g., the play control 1262).

Figure 15:
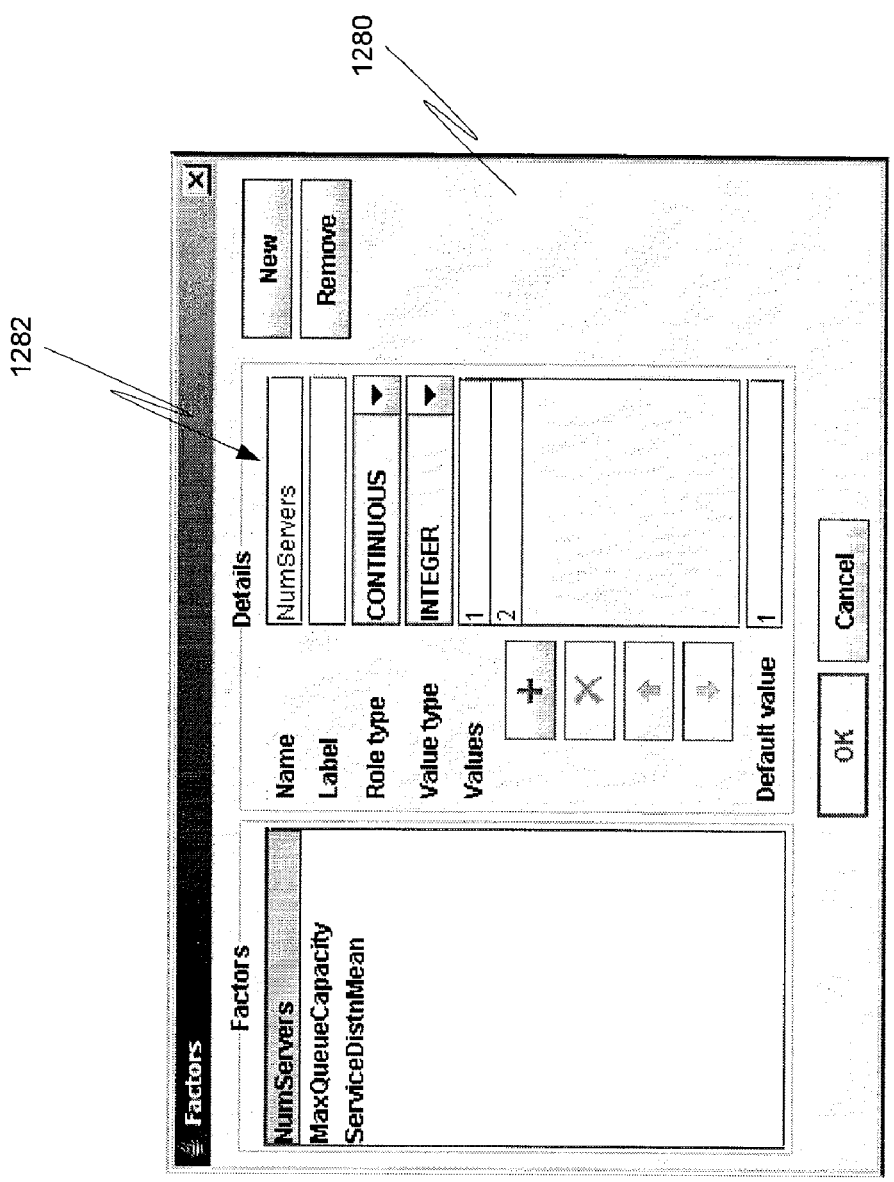

FIG. 15 depicts a screen shot at 1280 wherein a factor NumServers is being defined within a project's factors database with the details shown at 1282.

Figure 7:
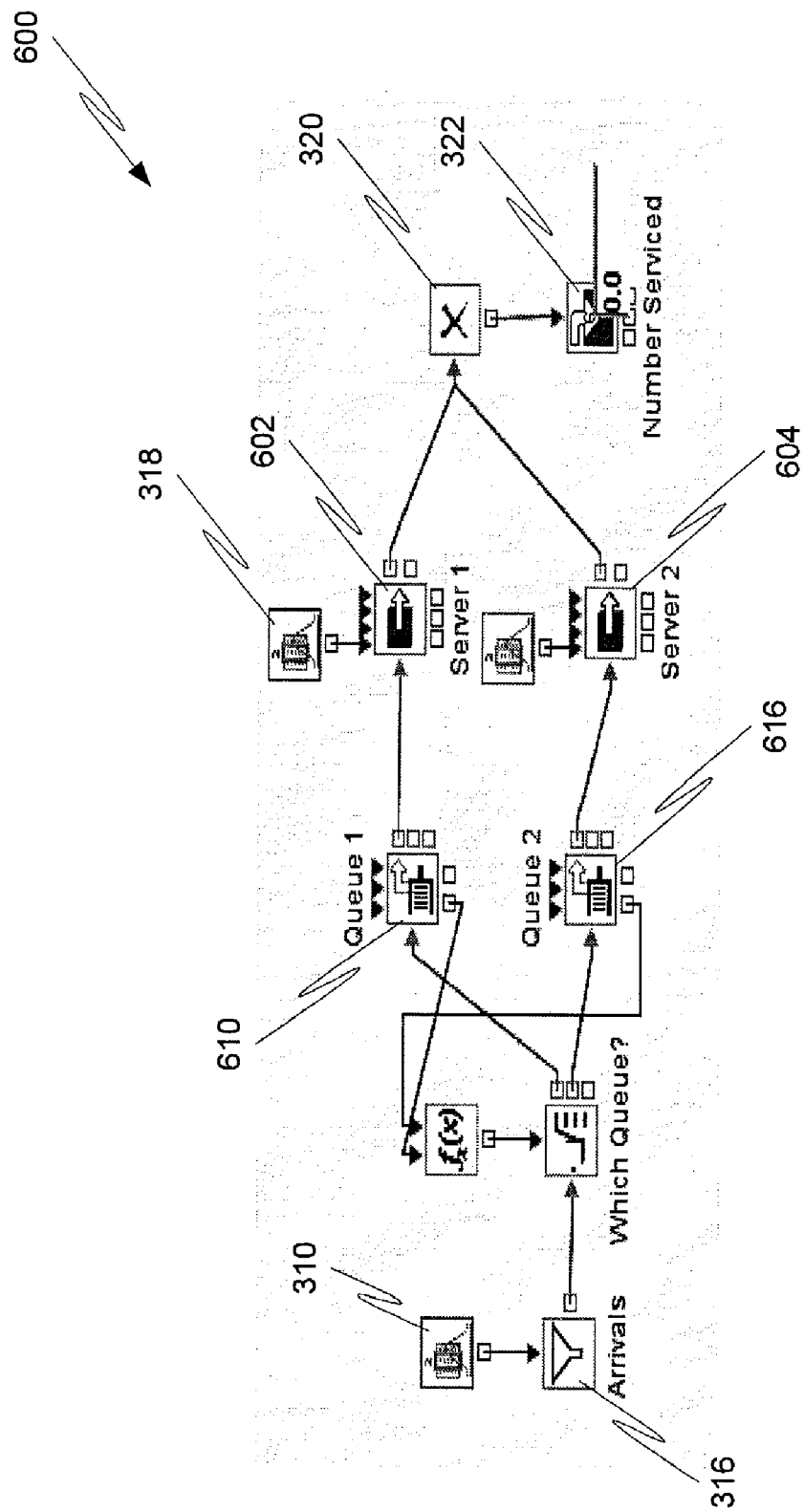
FIG. 7 depicts an example of another model.
Figure 16:
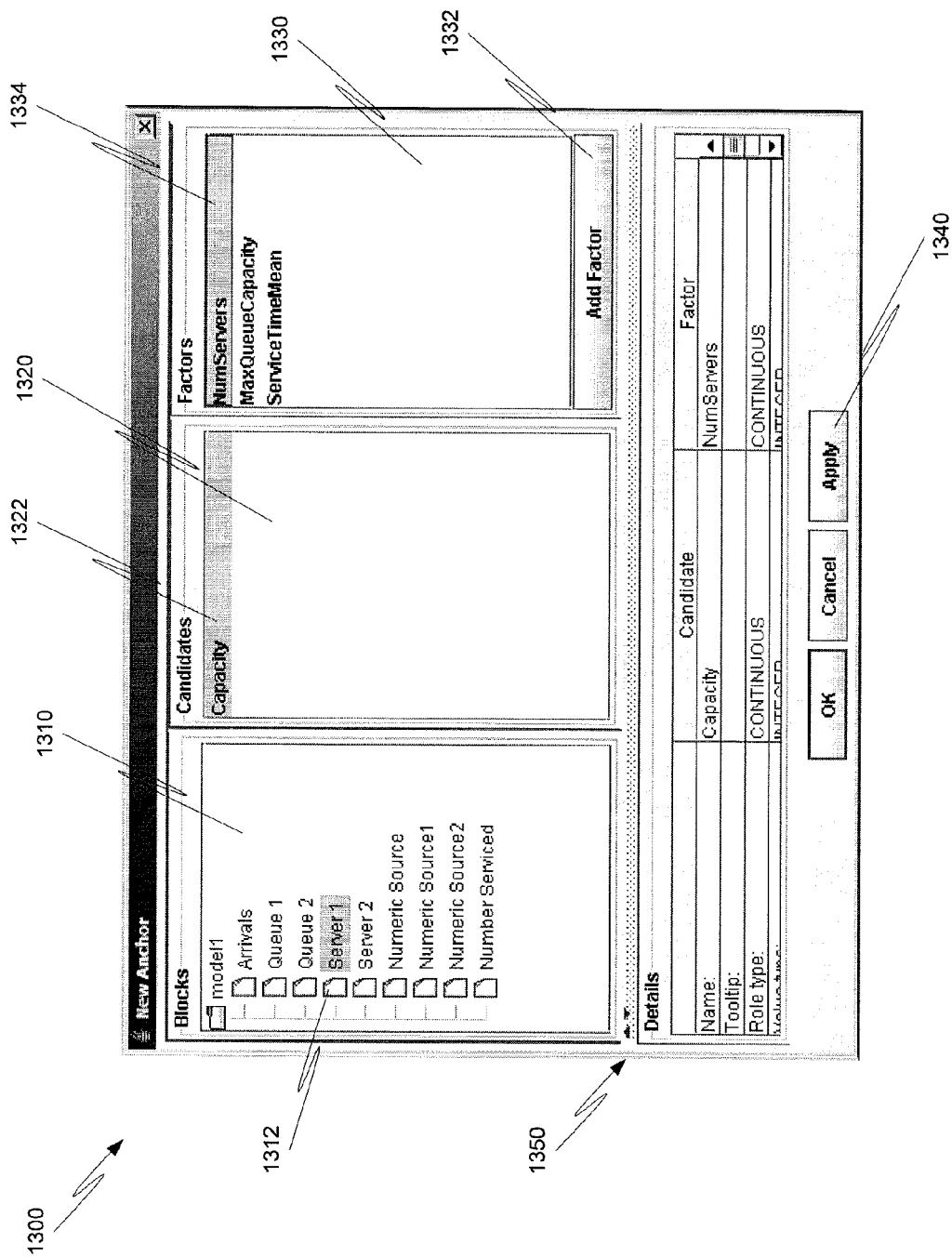

FIG. 16 depicts at 1300 a screen shot which shows creation of a factor anchor between the NumServers factor (that was defined in FIG. 15) and a component parameter from a model. Within the example of FIG. 16, the Blocks region 1310 of the screen shot 1300 lists the components of the model1, such as Server 1 1312. (Server 1 is shown in the model of FIG. 7 at 602.) With the Server 1 component being selected, the component candidate parameters are listed in the Candidates region 1320. In this example, the parameter Capacity is shown as selected at 1322. The Factors region 1330 is used to associate the selected parameter with a factor. Additional factors can be defined in the project's factors database and then added to the Factors region 1330 by clicking the Add Factor button 1332.

To create an anchor involving the Capacity parameter 1322 and the NumServers factor 1334, a user selects the NumServers factor 1334 and clicks the Apply button 1340. Additionally, details about the selected parameter and factor are shown in the Details region 1350. The factor anchor is then ready for use when the model is executed.

Figure 17:
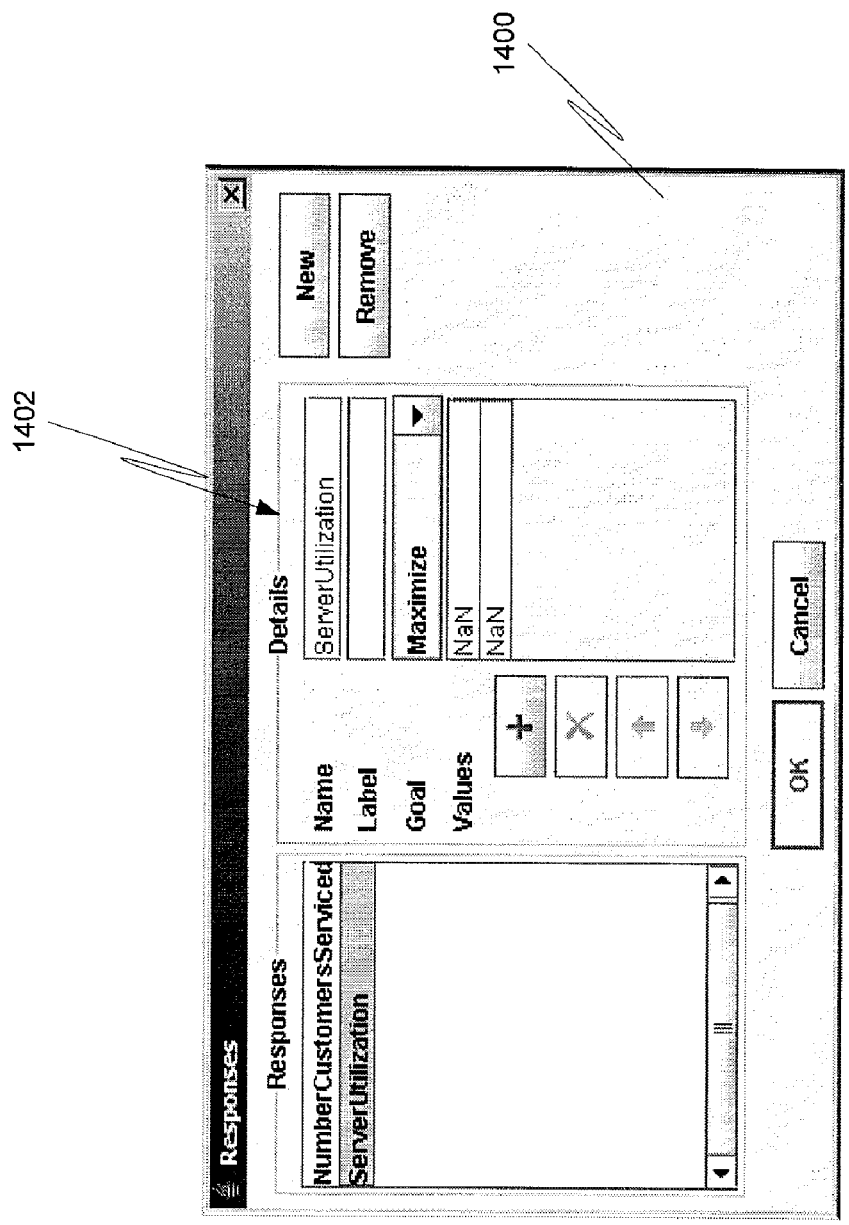

FIG. 17 depicts a screen shot at 1400 showing creation of a response, wherein a response ServerUtilization is being defined within a project's response database with the details shown at 1402. The screen shot 1400 also shows a response NumberCustomersServiced that has also been defined within the project's response database.

Figure 18:
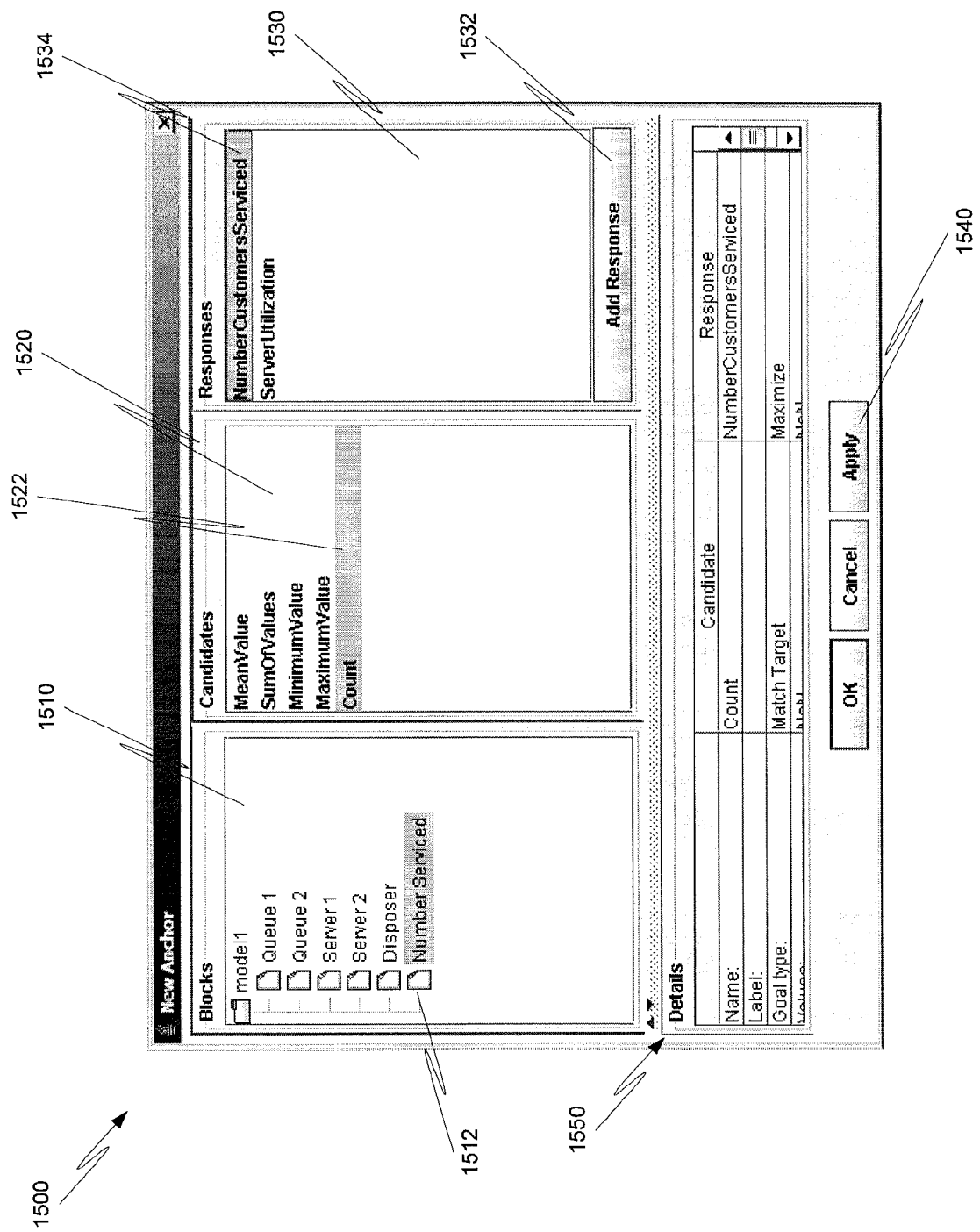

FIG. 18 depicts at 1500 a screen shot which shows creation of a response anchor between a NumberCustomersServiced response (that was shown in FIG. 17) and a component parameter from a model. Within the example of FIG. 18, the Blocks region 1510 of the screen shot 1500 lists the components of the model1, such as Number Serviced 1512. (This component is shown in the model of FIG. 7 at 322.) With the Number Serviced component being selected, the component candidate parameters are listed in the Candidates region 1520. In this example, the parameter Count is selected as shown at 1522. The Responses region 1530 is used to associate the selected parameter with a response. Additional responses can be defined in the project's responses database and then added to the Responses region 1530 by clicking the Add Response button 1532.

To create an anchor involving the Count parameter 1522 and the NumberCustomersServiced response 1534, a user selects the NumberCustomersServiced response 1534 and clicks the Apply button 1540. Additionally, details about the selected parameter and factor are shown in the Details region 1550. The response anchor is then ready for use when the model is executed.

As shown herein, a computer simulation environment can be provided that allows a user to create a project consisting of M simulation models and N experiments. For example, this approach enhances the modeling capabilities of SAS Simulation Studio by allowing the user to select and run any model-experiment pair within a project. Furthermore, this framework facilitates the reuse of models and experiments from different model-experiment pairs.

It should be understood that similar to the other processing flows described herein, the steps and the order of the approaches described herein may be altered, modified, removed and/or augmented and still achieve the desired outcome. For example, the following processing can be used with the approaches described herein. With respect to anchors and experiment factor and response linkage, each component may declare a list of input parameters as factor candidates. Similarly, each component may declare a list of output parameters for response candidates. An anchor contains information about the model or host component, the parameter candidate from the component, and the factor/response to link the candidate with. Each factor and response has a 'name' associated with it. Recall that factors and responses are included in an experiment. The runtime linkage between the factors and responses in the "current" experiment and the anchors in the "current" model is accomplished, in this example, by matching the name of the factor(s) and/or response(s) in the experiment with the name of a factor (or response) in the anchors information in the model. If no match is found, then that particular experiment factor or response is ignored during the execution of the model.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration of the wide scope of approaches described herein, the approaches can be executed in a batch mode. The following is an example command for running SAS Simulation Studio in 'batch mode'—that is, executing a simulation via a command line using a saved model and experiment:

$java -classpath SASSimulationjar com.sas.analytics. simulation.Simulation -m projects\MyProject\My-Model.simmdl - e projects\MyProject\MyExperiment. simexp It is further noted that the systems and methods may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

Figure 19:
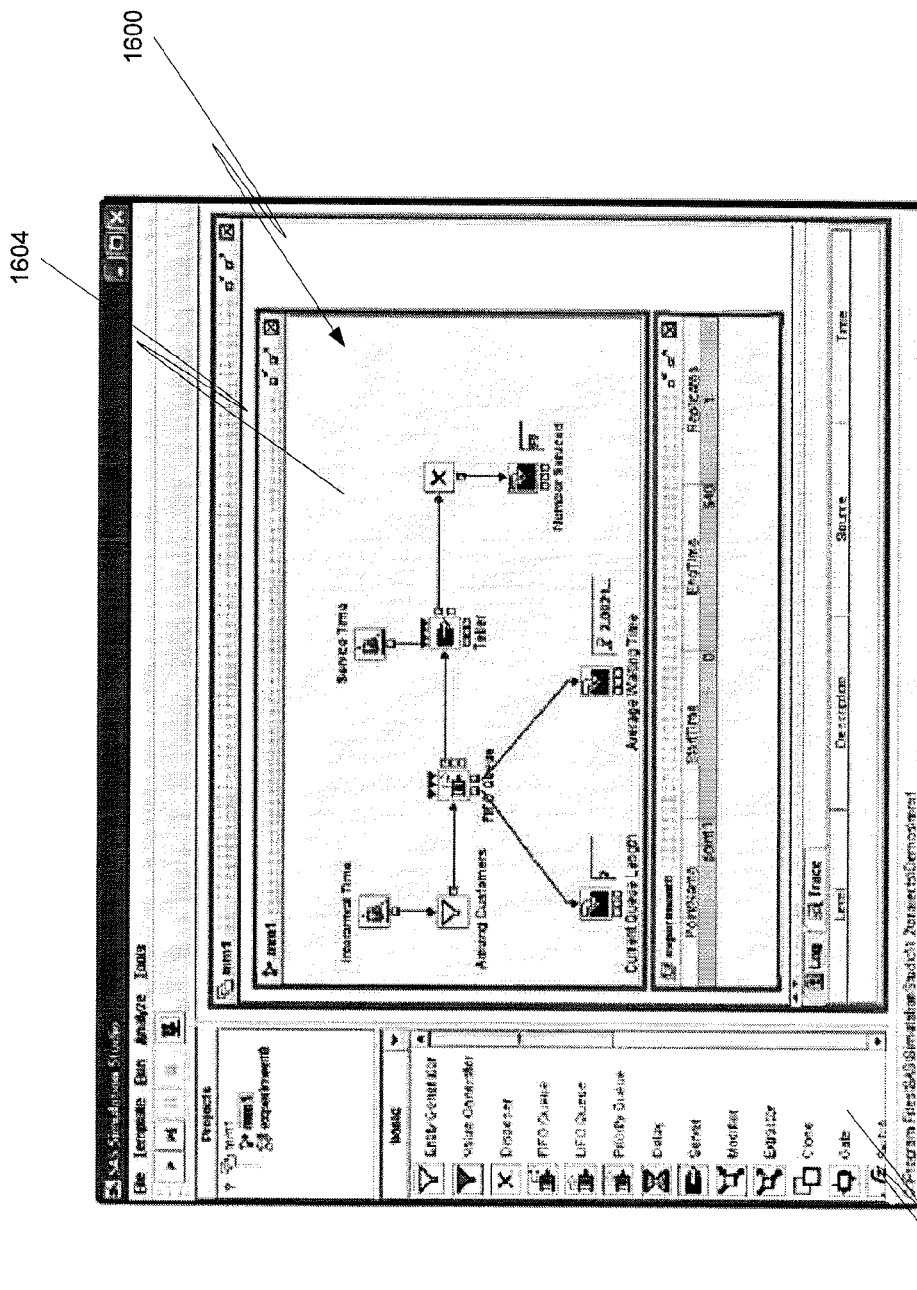
FIG. 19 is a screen shot of construction of a model.

As another illustration of the wide scope of the systems and methods, FIGS. 19 and 20 are screen shots depicting another example of handling stochastic model simulations. In FIG. 19, construction of a model 1600 is accomplished by dragging block icons from a template 1602 and dropping them into a Model window 1604 and connecting the block icons with arcs created by drag-and-drop. Note that in this modeling environment there are two types of input and output ports attached to the blocks. Ports, on the right and left sides of blocks, are used to pass entities between blocks via arcs. Ports, on the top and bottom sides of the blocks, are used to pass information between blocks, again via arcs. Examples of information flows in this example model include the service time for a Server block, the time between entity arrivals for an Entity Generator block, and performance metrics (length of queue, wait time) from a Queue block. Once the model is built, a user can run it by using the controls on the toolbar at the top of the window.

In order to run a model, a user clicks the Start button (leftmost button, with the "Play" icon). For debugging purposes a user might want to click the Animate button (rightmost button, with the movie camera icon) first to show the flow of entities and information through the model. The run of the model can be paused at any time by clicking the Pause button (third button from the left). A user stops and resets the model run by clicking the Reset button (second button from the right, with the "Stop" icon). These controls are also available via the Run pull-down menu, along with controls that enable the user to view the simulation clock and the count of replications run for the model.

FIG. 20 shows at 1700 an experiment window for a repair shop simulation model. There are three factors (shown at 1710, 1712, and 1714) which denote staffing levels (number of servers) at the Quality Control, Repair, and Service locations. There are seven responses (shown at 1720, 1722, 1724, 1726, 1728, 1730, and 1732): number of units fixed and, for each of Quality Control, Repair, and Service locations, metrics on the average wait and the average utilization of the servers. Virtual mappings between the component parameters and the factors/responses are created and used during execution of the model. As an illustration of the execution results, design point number 4 has been expanded to show the results for each of its five replications. The remaining rows display response figures that represent the mean of the results from their five replications.

For any design, a user can run the replications associated with design points by highlighting the desired rows in the experiment window 1700 and clicking the Start button on the toolbar. If a user chooses to run the entire design, then the user should highlight all of the rows. A user will see each selected design point's row highlighted with red text in turn as they are run; in the highlighted row the response column values are refreshed as each replication is run. After the run has completed, a user can click the arrow in the Replicates column to expand the design point and make each replication visible.

As another example of the wide scope of the systems and methods described herein, the systems and methods may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the systems and methods described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for executing a simulation, comprising:
    defining, using one or more processors, a plurality of experiments, wherein an experiment includes a factor and a response, wherein the factor includes input data for performing a simulation, and wherein the response includes a data structure for storing a simulation result;

defining, using the one or more processors, a plurality of models, wherein a model includes an input model component and an output model component;

generating, using the one or more processors, one or more links between the plurality of experiments and the plurality of models, wherein links are generated using factor anchors and response anchors, wherein a factor anchor includes a mapping between a factor of an experiment and an input model component of a model, and wherein a response anchor includes a mapping between a response of an experiment and an output model component of a model;

generating, using the one or more processors, a many-to-many mapping using the one or more links between the plurality of experiments and the plurality of models;

selecting, using the one or more processors, an experiment and a model that have been linked by the many-to-many mapping using a factor anchor and a response anchor;

resolving, using the one or more processors, the factor anchor, wherein resolving the factor anchor includes initializing the model by initializing the input model component of the model with input data from the factor of the experiment;

resolving, using the one or more processors, the response anchor, wherein resolving the response anchor includes configuring the response of the experiment to receive a simulation result from the output model component of the model; and executing, using the one or more processors, the simulation using the initialized model, wherein executing the simulation includes generating the simulation result and providing the simulation result to the response of the experiment.

2. The method of claim 1, wherein the model has no direct ties to the experiment and the experiment has no direct ties to the model.

3. The method of claim 1, wherein the links between the plurality of experiments and the plurality of models are temporary links.

4. The method of claim 1, wherein the mapping between the factor of the experiment and the input model component of the model and the mapping between the response of the experiment and the output model component of the model are each virtual mappings.

5. The method of claim 1, further comprising:
storing the factor anchors and the response anchors in one or more databases.

6. The method of claim 1, wherein the links are indirect links between the plurality of experiments and the plurality of models.

7. The method of claim 1, wherein the simulation is a simulation of an artificial system.

8. The method of claim 7, wherein the artificial system is a medical system, a construction system, a power consumption system, an automotive assembly plant system, or a bank transaction system.

9. The method of claim 7, wherein the artificial system includes a source of random variation, and wherein the input model component is a stochastic model component configured to represent the source of random variation.

10. The method of claim 9, wherein a random number generator is configured to generate a sample from a statistical distribution to represent the source of random variation.

11. The method of claim 10, wherein the random number generator uses a pseudo-random number to generate the sample from the statistical distribution.

12. The method of claim 11, wherein the pseudo-random number is a sample from a uniform distribution on an interval [0,1].

13. The method of claim 10, wherein the statistical distribution is an exponential distribution, a uniform distribution, a normal distribution, or a beta distribution.

14. The method of claim 7, wherein the simulation result provides statistically valid inferences about performance of the artificial system.

15. The method of claim 1, wherein resolving the factor anchor includes initializing a parameter of the input model component of the model with the input data from the factor of the experiment.

16. A system for executing a simulation, comprising:
one or more processors;
one or more non-transitory computer-readable storage mediums containing instructions configured to cause the one or more processors to perform operations including:
defining a plurality of experiments, wherein an experiment includes a factor and a response, wherein the factor includes input data for performing a simulation, and wherein the response includes a data structure for storing a simulation result;
defining a plurality of models, wherein a model includes an input model component and an output model component;
generating one or more links between the plurality of experiments and the plurality of models, wherein links are generated using factor anchors and response anchors, wherein a factor anchor includes a mapping between a factor of an experiment and an input model component of a model, and wherein a response anchor includes a mapping between a response of an experiment and an output model component of a model;
generating a many-to-many mapping using the one or more links between the plurality of experiments and the plurality of models;
selecting an experiment and a model that have been linked by the many-to-many mapping using a factor anchor and a response anchor;
resolving the factor anchor, wherein resolving the factor anchor includes initializing the model by initializing the input model component of the model with input data from the factor of the experiment;
resolving the response anchor, wherein resolving the response anchor includes configuring the response of the experiment to receive a simulation result from the output model component of the model; and
executing the simulation using the initialized model, wherein executing the simulation includes generating the simulation result and providing the simulation result to the response of the experiment.

17. A non-transitory computer program product for executing a simulation, tangibly embodied in a machine-readable non-transitory storage medium, including instructions configured to cause a data processing system to:
define a plurality of experiments, wherein an experiment includes a factor and a response, wherein the factor includes input data for performing a simulation, and wherein the response includes a data structure for storing a simulation result;
define a plurality of models, wherein a model includes an input model component and an output model component;

generate one or more links between the plurality of experiments and the plurality of models, wherein links are generated using factor anchors and response anchors, wherein a factor anchor includes a mapping between a factor of an experiment and an input model component of a model, and wherein a response anchor includes a mapping between a response of an experiment and an output model component of a model;

generate a many-to-many mapping using the one or more links between the plurality of experiments and the plurality of models;

select an experiment and a model that have been linked by the many-to-many mapping using a factor anchor and a response anchor;

resolve the factor anchor, wherein resolving the factor anchor includes initializing the model by initializing the input model component of the model with input data from the factor of the experiment;

resolve the response anchor, wherein resolving the response anchor includes configuring the response of the experiment to receive a simulation result from the output model component of the model; and execute the simulation using the initialized model, wherein executing the simulation includes generating the simulation result and providing the simulation result to the response of the experiment.

* * * * *